United States Patent
Singhal et al.

(10) Patent No.: US 10,721,182 B2
(45) Date of Patent: Jul. 21, 2020

(54) SYSTEM AND METHOD FOR MAXIMIZING RESOURCE CREDITS ACROSS SHARED INFRASTRUCTURE

(71) Applicant: VMWARE, INC., Palo Alto, CA (US)

(72) Inventors: Sahil Singhal, Cambridge, MA (US); Andi Abes, Waltham, MA (US)

(73) Assignee: VMWARE, INC., Palo Alto, CA (US)

( * ) Notice: Subject to any disclaimer, the term of this patent is extended or adjusted under 35 U.S.C. 154(b) by 13 days.

(21) Appl. No.: 16/024,146

(22) Filed: Jun. 29, 2018

(65) Prior Publication Data

US 2020/0007462 A1 Jan. 2, 2020

(51) Int. Cl.
*H04L 12/911* (2013.01)
*G06F 9/50* (2006.01)
(Continued)

(52) U.S. Cl.
CPC .......... *H04L 47/783* (2013.01); *G06F 9/5077* (2013.01); *G06F 9/5083* (2013.01); *H04L 41/0896* (2013.01); *H04L 47/76* (2013.01); *H04L 47/822* (2013.01); *H04L 47/823* (2013.01); *H04L 47/826* (2013.01); *G06F 9/45533* (2013.01)

(58) Field of Classification Search
CPC .. G07F 17/32; G07F 17/3267; G07F 17/3244; G07F 17/3269; G06Q 40/12; G06Q 10/067; G06Q 10/10; G06F 9/50; G06F 16/2237; G06F 16/24554; G06F 16/24578; G06F 16/2462; G06F 16/285; G06F 16/9535; G06F 15/76; G06F 2009/4557; H04L 67/12; H04L 43/08; H04L 47/70
See application file for complete search history.

(56) References Cited

U.S. PATENT DOCUMENTS 9,697,274 B2 * 7/2017 Balmin ................ G06F 16/285
2006/0252518 A1 * 11/2006 Walker ................ G07F 17/32
463/25

(Continued)

OTHER PUBLICATIONS

"Amazon EC2 Auto Scaling", 9 pages, https://aws.amazon.com/ec2/autoscaling/?sc_channell=ba&sc_campaign . . . c_medium=button&sc_country=global&sc_geo=global&sc_outcome=aware, retrieved Aug. 24, 2018.

(Continued)

*Primary Examiner* — Ninos Donabed
(74) *Attorney, Agent, or Firm* — Hanley, Flight & Zimmerman, LLC (57) ABSTRACT

A computer-implemented method of adjusting a resource credit configuration for cloud resources that includes collecting a resource credit inventory and attributing metadata related to resources from one or more cloud resources. An expected resource demand is determined. A plurality of resource credit configurations is determined that matches the determined expected resource demand. An improved resource credit benefit based on the resource credit inventory and on the plurality of credit configurations is determined that matches the determined expected resource demand. A modified attribute metadata based on the determined improved resource credit benefit is then determined.

14 Claims, 6 Drawing Sheets

(51) Int. Cl.
    *H04L 12/24* (2006.01)
    *H04L 12/917* (2013.01)
    *G06F 9/455* (2018.01)

(56) References Cited

U.S. PATENT DOCUMENTS

| | | | | |
|---|---|---|---|---|
| 2011/0145413 | A1* | 6/2011 | Dawson | G06Q 40/025 709/226 |
| 2011/0213884 | A1* | 9/2011 | Ferris | G06F 9/50 709/226 |
| 2012/0131176 | A1* | 5/2012 | Ferris | G06F 9/5072 709/224 |
| 2012/0131594 | A1* | 5/2012 | Morgan | G06F 9/5072 718/105 |
| 2012/0179824 | A1* | 7/2012 | Jackson | G06F 9/5027 709/226 |
| 2012/0221454 | A1* | 8/2012 | Morgan | G06F 9/5027 705/37 |
| 2012/0311154 | A1* | 12/2012 | Morgan | H04L 12/6418 709/226 |
| 2014/0019617 | A1* | 1/2014 | Hadar | G06F 9/45558 709/225 |
| 2014/0053226 | A1* | 2/2014 | Fadida | H04L 67/34 726/1 |
| 2014/0126418 | A1* | 5/2014 | Brendel | H04L 12/4641 370/254 |
| 2015/0088783 | A1* | 3/2015 | Mun | G06Q 10/04 705/36 R |
| 2015/0120501 | A1* | 4/2015 | Jung | G06Q 30/0613 705/26.41 |
| 2015/0120555 | A1* | 4/2015 | Jung | G06Q 20/40 705/44 |
| 2015/0186493 | A1* | 7/2015 | Balmin | G06F 16/285 707/609 |
| 2015/0199882 | A1* | 7/2015 | Fernando | G07G 1/0018 345/173 |
| 2015/0339170 | A1* | 11/2015 | Guan | G06F 9/4881 718/104 |
| 2015/0350108 | A1* | 12/2015 | Baughman | H04L 47/823 709/226 |
| 2016/0036809 | A1* | 2/2016 | Bhimanaik | H04L 63/10 726/4 |
| 2016/0077846 | A1* | 3/2016 | Phillips | G06F 9/45558 718/1 |
| 2016/0094622 | A1* | 3/2016 | Thomas | H04L 67/10 709/203 |
| 2016/0256784 | A1* | 9/2016 | Schultz | A63F 13/79 |
| 2017/0083626 | A1* | 3/2017 | Kensel | G06N 5/04 |

OTHER PUBLICATIONS

Jeff Barr, "AWS Auto Scaling", Jan. 6, 2018, 8 pages, Amazon Web Services, Inc., https://aws.amazon.com/autoscaling/, retrieved Aug. 24, 2018.

Jiangjie (Becket) Qin, et al., "Introduction to Kafka Cruise Control", 2016, 47 pages, LinkedIn Corporation, https://www.slideshare.net/JiangjieQin/introduction-to-kalka-cruise-control-68180931, retrieved Aug. 24, 2018.

"What are Virtual Machine Scale Sets?" Mar. 26, 2018, 3 pages; https://docs.microsoft.com/en-us/azure/virtual-machine-scale-sets/overview, retrieved Aug. 24, 2018.

Meng Zhang, "Nuage: Making Data Systems Management Scalable", Aug. 7, 2018, 7 pages, LinkedIn Corporation, https://engineering.linkedin.com/blog/2018/08/nuage—making-data-systems-management-scalable, retrieved Aug. 24, 2018.

Manish Dubey, "Rain: Better Resource Allocation Through Containerization", May 10, 2016, 6 pages, LinkedIn Corporation, https://engineering.linkedin.com/blog/2016/05/rain—better-resource-allocation-through-containerization, retrieved Aug. 24, 2018.

U.S. Appl. No. 15/952,181, filed Apr. 12, 2018 in the USPTO.
U.S. Appl. No. 15/722,356, filed Oct. 2, 2017 in the USPTO.

* cited by examiner

RESOURCE CREDIT INVENTORY

| COUNT | RESOURCE CREDIT ATTRIBUTE | RESOURCE CREDIT NORMALIZED VALUE |
|---|---|---|
| 1 | M3.2xLARGE | 16 |

SERVERS IN THE CLOUD

| EXAMPLE SERVER ATTRIBUTE | SERVER % USAGE | RESOURCE CREDIT NORMALIZED VALUE |
|---|---|---|
| M3.2xLARGE | 97% | 16 |
| M3.xLARGE | 100% | 8 |
| M3.LARGE | 100% | 4 |
| M3.LARGE | 97% | 4 |

| EXAMPLE SERVER ATTRIBUTE | SERVER % USAGE | SERVERS IN THE CLOUD SERVER WEIGHT | SERVER VALUE (% USAGE* NORMALIZATION) | MAXIMIZED VALUE TO CAPACITY |
| --- | --- | --- | --- | --- |
| M3.2xLARGE | 97% | 16 | 15.52 | CAPACITY:16<br>MAX VALUE: 15.52 |
| M3.xLARGE | 100% | 8 | 8 | CAPACITY:8 + 4 + 4 <= 16<br>Max value:<br>8+4+3.88 = 15.88 |
| M3.LARGE | 100% | 4 | 4 | |
| M3.LARGE | 97% | 4 | 3.88 | |

520

SYSTEM AND METHOD FOR MAXIMIZING RESOURCE CREDITS ACROSS SHARED INFRASTRUCTURE

The section headings used herein are for organizational purposes only and should not to be construed as limiting the subject matter described in the present application in any way.

INTRODUCTION

Many businesses are increasingly moving their information technology to cloud-based systems and/or cloud computer infrastructures. These systems often rely, at least in part, on infrastructure-as-a-service and/or software-as-a-service models, in which users pay for a variety of compute, processing and application capabilities that are available with varied pricing models. Pricing varies due to a number of different parameters including, for example, location, capacity, type of service, payment models that include pay-as-you go and prepayment models, and usage models. Pricing models and services also vary by service provider. In addition, both pricing and usage are prone to change over both long and short time scales. The large array of options makes maximizing the price/performance of these systems challenging. Consequently, methods and systems are required which provide automated methods to manage the costs and/or other benefits associated with these systems. This includes methods and systems that can optimize the payments for services based on past, present and future usage, and based on the various pricing models available for these services. This also includes methods and systems that can optimize usage patterns to maximize a benefit such as a quality of service provided for a particular usage pattern.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments of steps of the method as long as the teaching remains operable.

Many aspects of the present teaching relate to cloud-based computer infrastructures. The terms "cloud" and "cloud-based infrastructure" as used herein include a variety of computing resources, computers and software services, and networking resources that run over a variety of physical communications infrastructures, including wired and/or wireless infrastructures. These physical communication infrastructures may be privately or publicly owned, used and operated. In particular, it should be understood that the term "cloud" as used herein can refer to all of private clouds, public clouds, and hybrid clouds when appropriate. The term "private cloud" refers to computer hardware, networking and computer services that run entirely or almost entirely over a private or proprietary infrastructure. The term "public cloud" refers to computer hardware, networking and services that are operated by a service provider for the use and benefit of many independent organizations and third party users, and is typically accessible over public networks. The term "hybrid cloud" refers to computer hardware, networking, and services that utilize infrastructure in both the private cloud and in the public cloud.

Service providers that manage cloud infrastructure provide different mechanisms for consumers to pay for the services. For example, service providers offer different consumption models that allow their customers to select between different tradeoffs. One important tradeoff is between payment models. For example, users may select pay-as-you-go payment for resources as they are consumed. Users may also commit to certain consumption levels. Finally, users may select prepayment for future resource consumption. In comparing these alternatives for consumption of equivalent resources, the pay-as-you-go model usually is the highest priced, followed by committed usage. The cheapest per-unit cost usually is the prepayment option.

Thus, enterprises relying on cloud-based infrastructure can save on cost through pre-purchase or through committing to certain usage levels, or some other formula offered by the cloud provider. Enterprises relying on cloud-based infrastructure may also be afforded other benefits, such as particular qualities of service or resource availablity, through, for example committing to particular usage patterns, or through some other formula offered by the cloud provider. Cloud providers typically offer some form of resource credit system that can be pre-purchased and then applied toward the infrastructure resource usage demands generated by the enterprise. Due to the fluctuating nature of infrastructure usage patterns, maximizing resource credits across the infrastructure requires a method for changing the configuration of the credits applied based on the actual usage. The activity may be, for example, current usage, or the activity may include historical activity patterns, or the activity may include a combination of these. The system and method of the present teaching uses algorithms to optimally or near-optimally match a resource credit configuration to an asset or set of assets as depending on the flexibility of the credit.

Public cloud providers, such as Amazon, Microsoft and Google, offer various reserved models to prepay for various services. In general, a prepayment model includes purchasing a resource credit. The resource credit entitles the purchaser to a cost benefit for any consumed cloud resources that match particular attributes configured in the current state of the resource credit. Resource credits and associated consumed resource examples are described further below.

As an example of the resource credits, the Amazon Web Services (AWS) public cloud allows purchase of Reserved Instances (RI) of various kinds. The different kinds of RI's, among other qualities, differ in which attributes of the RI and the cloud resource must match for the credit to be applied to the cost of the resource. In the case of a server instance, the required matching attributes include availability zone, location, server class and/or server size. Server instances are just one example of reservations. Reservations can also be placed for services like elasticache, elasticsearch, and a variety of other known services, including both software-based services and infrastructure-based services.

As a second example of resource credits, the Azure cloud, which is provided by Microsoft, offers a class of resource credits in the form of Virtual Machine Reservations of various kinds. These credits, when applicable to a particular demand, provide cost benefits for the use of the virtual machine resources.

As a third example of resource credits, Google Cloud Compute Engine offers the ability to purchase committed use contracts in return for deeply discounted prices for virtual machine usage. These discounts are referred to as committed use discounts.

Examples of consumed cloud resources include a data storage unit, such as a disk drive, a central processing unit (CPU), a virtual machine (VM), and/or a snapshot, which is a state of a computing system or a virtual machine at a particular point in time. Consumed resources may also include network transit services, application or software-process services such as search or other services.

Some services might be offered at a discounted per-unit rate, if a commitment is made by a user to pay for a certain amount of consumption. As an example, an enterprise might be offered a steep discount if it commits to consuming 100 TB (terabytes) of network transit services (i.e. total amount of data transferred over a network, typically wide-area). Both commitment and discounts can be limited to matching attributes, in many cases the geographic region in which network transit is consumed.

As a further example, some service providers will guarantee a higher level of availability as an incentive for consumers to declare the expected usage patterns. Resource consumers will be provided an availability guarantee, as long as the resource requests conform to pre-declared server configurations (e.g. servers with 4 Gigabytes of memory, 2 CPU's and 100 GB of disk storage capacity). The resource consumer can request new conforming configurations, which will benefit from the higher service level guarantee (the higher availability). Any nonconforming configurations will be serviced by the provider at a lower guarantee. A "resource credit" in this example is not purchased, and the value accrued is not directly monetary, but can include some other benefit that can be quantified, such that it can be optimized using an optimization algorithm.

Thus, different service providers have different reservations schemes for various services and also use different names for the credits. The term resource credit as used herein is a general term intended to include various forms and structures of credits. For example, these may be credits for prepayments of services to be consumed. Resource credits may also include other attributes or qualities associated with a reservation for provisioning of services to be consumed. These may include, for example, credits acquired based on non-monetary commitments by the consumer, such as particular usage patterns or other commitments. The other attributes or qualities of the non-monetary-based resource credits can be associated with a variety of benefits to the consumer. Resource credits are held and managed by the user/consumer, and applied, within various constraints set by the service provider, to services that are consumed. The different ways of applying resource credits to elements in any form of cloud infrastructure may be referred to as different resource credit configurations.

Services consumed in cloud infrastructures are also varied and include software- and application-based services as well as infrastructure services that are both virtual and/or hard-wired. As such, an element of cloud infrastructure is a general term that includes services, applications, software processes, virtual machines, virtual storage systems, as well as hardwired machines that include at least processing, storage and/or networking capabilities. An element may include one, some or all of these functions.

One feature of the method and system of the present teaching is providing a service that ensures that resource credits are modified, either manually or automatically, in such a way as to maximize the accrued benefits from available resource credits in the presence of continuous fluctuations in demand levels of cloud resources. For example, some embodiments provide a maximal benefit from available resource credits in the face of a changing composition of servers provisioned in the cloud environment. This may include, for example a size, a number, and/or a location of servers provisioned in the cloud environment. Some embodiments of the method and system of the present teaching generally solve the problem of providing maximum credit application across a set of resources for which credits can be applied. The types of credits and/or the elements/resources to which they are applied can change over time.

One feature of the present teaching is that it can provide mathematically optimal, or near-optimal, solutions through application of algorithms to determine an optimum. The optimum generally represents the maximum credit benefit.

In other words, the optimum is generally a maximum benefit value given a resource credit inventory and given a particular usage of cloud resources.

In contrast, prior art credit application solutions are not guaranteed to be optimal. As a result, in these prior art systems, some of the application of credits can be unrealized. Thus, these prior art system leave credits that have been paid for or otherwise acquired unused and/or underutilized. Perhaps even worse, the amount of unused or underutilized resource credits is unknown. By achieving optimum credit application, the answer to the question "how do I save as much money as I can for the resources and credits I own?" can be answered. In addition, results from embodiments of the system and method of the present teaching provide the unused/underutilized resource credits as well as the unoptimized cloud infrastructure. This identification of unused or underutilized resource credits is a critical problem faced today by cloud users.

One feature of the method and system of the present teaching is that it can deal with the case in which infrastructure that already has resource credits applied can re-apply those credits more beneficially elsewhere. This is unlike known resource credit management systems that tend to miss critical assignments of resource credits. Some embodiments of the present teaching use an optimization algorithm that normalizes resource credit types and then maximizes the application of the normalized credits to their applicable infrastructure. As such, the decision to apply a resource credit to an asset is based on the running time of an asset relative to others that can employ the same resource credit.

In general, the discounted rate of a resource credit is applied when the attributes of an instance usage match attributes of an available resource credit. Some resource credits are static, and apply best to a steady-state usage. Other resource credits are convertible. For example, some resource credits offer the ability to change families, operating system types, and tenancies over the life of the credit.

Resource credits also offer the ability to provide a capacity reservation. This capacity may or may not be restricted to a region or location. Other types of resource credits may also be scoped to a region. For example, these types of reservations automatically apply a discount to instance usage across a region and instance sizes in a region. Some resource credits are time based. These credits can be launch within particular reserved time windows. For example, they may be applied for part of a day, a week, or a month.

The application of resource credits occurs generally when used instance attributes are matched to the attributes of the credit. For example, these attributes may include instance type (CPU, memory, storage, and/or networking capacity), platform type, tenancy, and/or location.

Figure 1:
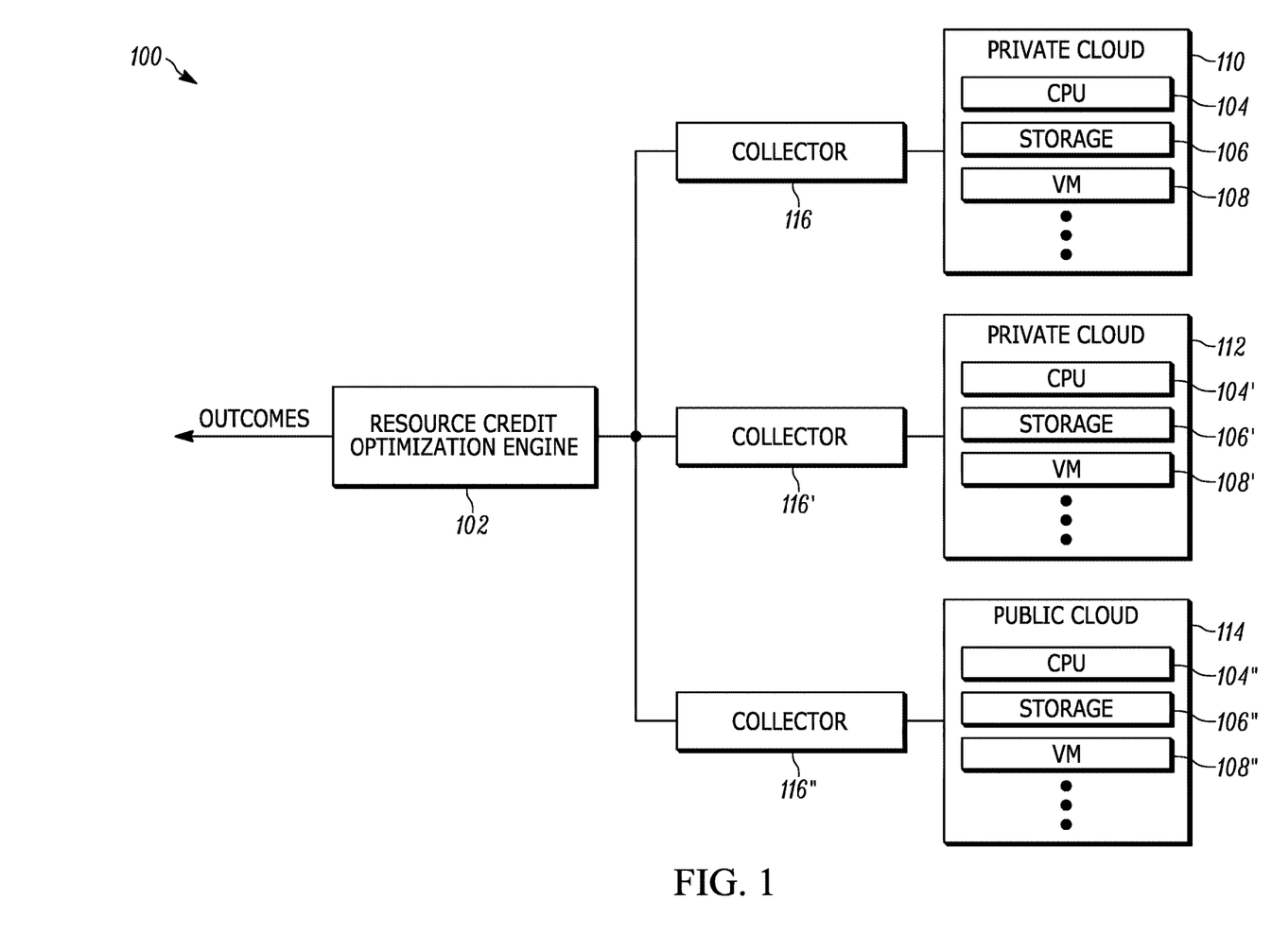
FIG. 1 illustrates a block diagram of an embodiment of a system for adjusting resource credits for a cloud infrastructure according to the present teaching.

FIG. 1 illustrates a block diagram of an embodiment of a system 100 for adjusting resource credits for a cloud infrastructure according to the present teaching. The system 100 includes a resource credit optimization engine 102 that is capable of optimally, or near-optimally, matching the usage demand on one or more cloud infrastructure elements such as, for example, CPU 104, 104', 104", storage 106, 106', 106" or virtual machine 108, 108', 108" that reside in any of a private cloud 110, 112, or public cloud 114. One skilled in the art will appreciate that systems according to the present teaching can be used to adjust resource credits for other resources that are not shown explicitly in the figure.

Collectors 116, 116', 116" leverage interfaces to the public cloud providers, and potentially other cloud-infrastructure service providers, to collect the current state of both resource credits and resource elements present in the cloud environment. In some embodiments, the current state is represented by an inventory of the available resource credits, which can be a set of the prepaid reservations that are available for a cloud infrastructure. The current state of the resource credit can also be represented by attribute metadata associated with the reservations, which can be, for example, location, instance type, platform, time window and/or other attributes. The current state of the resource elements can also be represented by a demand capacity, usage time, location and/or other attributes.

The resource credits have a certain known degree of flexibility. That is, their attributes can be changed within certain known ways, allowing them to be applied more broadly to the cloud infrastructure. This allows the resource credits to be reconfigured to meet particular demands. The results of the collection process from the collectors 116, 116', 116" are made available to the resource credit optimization engine 102. The resource credit optimization engine 102 generates an expected resource demand. In various embodiments, the optimization engine 102 can leverage either the most current state of resource element demand level or can historical summarize averages of resource demand levels in its calculations. This basis, current demand or historical, may be provided, for example, by direction from users or other automated systems (not shown).

When using current demand levels, the algorithm used by the optimization engine 102 can assume that the current levels will persist for a defined time in the future. When using the historical summaries, the optimization engine 102 computes an expected demand level for a defined future period. The optimization engine 102 then generates the optimal configuration of available resource credits to achieve the maximal cost benefits during the defined time period, and provides these outcomes to the user. This is generally achieved by determining the best of the various configurations of resource credits that are possible to meet the expected demand.

In various embodiments, the outcomes of the optimization performed by the optimization engine 102 can initiate an automatic reconfiguration of the resource credits such that they are optimally applied to the demand instance of the user by the service provider. In some embodiments, the maximal resource credit configuration determined by the optimizer is provided by changing the resource credit attribute metadata to represent the determined optimal configuration of resource credits.

Figure 2:
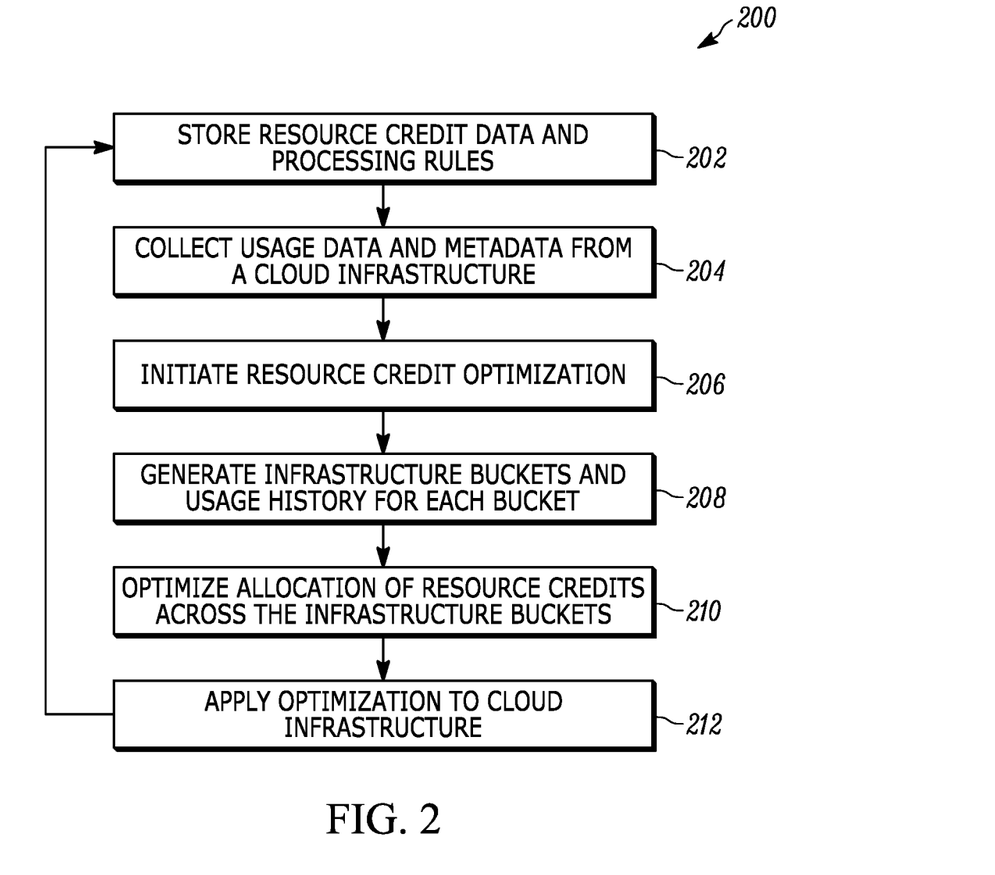
FIG. 2 illustrates a process flow diagram of an embodiment of a method for adjusting resource credits for a cloud infrastructure according to the present teaching.

FIG. 2 illustrates a process flow diagram of an embodiment of a method 200 for adjusting resource credits for a cloud infrastructure according to the present teaching In step one 202, stored resource credit data and processing rules for determining an optimal configuration of resource credits are provided. These may be provided by a storage repository of some kind, and/or by inputs from a user or other automated system. In some embodiments, the resource credit data includes an inventory of available resource credits including attribute metadata associated with the credits. A variety of rules may be provided that are used to implement the method 200. For example, such processing rules can include: (1) rules to associate resource credits to infrastructure that generate a bounded environment with limited possibilities for processing; (2) rules to apply resource credits to history of activity of infrastructure; (3) rules to convert history of activity to a histogram based on infrastructure metadata; (4) rules to group infrastructure based on metadata (e.g. infrastructure buckets); (5) rules to group resource credits into applicable infrastructure buckets based on metadata; (6) rules to maximize normalized resource credits to cloud infrastructure via dynamic memorization or other algorithm; and/or (7) rules to assess impact of maximization rules.

Other processing rules include rules used to apply various configurations of available resource credits to an expected demand. In some embodiments the processing rules include rules to implement a combinatorial optimization of the maximal value provided by a particular configuration of resource credits applied to the expected demand, where the configuration of resource credits is constrained by a capacity of the resource credit inventory. For example, the value of elements in a cloud infrastructure can be the cost of these servers running in cloud. The value could be a dollar amount, but also may be measured and/or normalized by other parameters that reflect, for example, the value to the business and/or a cost of running process and/or a quality of service and/or an availability of resources.

In one particular embodiment, the rules include steps to implement a knapsack algorithm. The rules can also include steps for addressing other constraints, such as constraints based on desires of the users and/or constraints that are particular to the infrastructure or demand instance(s) being processed.

In step two 204 of the method 200, data on the resource credits and usage of the infrastructure is collected. In some embodiments, resource credit data includes an inventory of available resource credits and attribute metadata associated with the available credits. In some embodiments, usage data is demand data from a set of cloud infrastructure elements, such as servers, CPU's memory, VM's and or other cloud resources. In some embodiments, the demand data is current demand data. In other embodiments the demand data is historical demand data. In some embodiments, both types of demand data are used.

In step three 206 of the method 200, the processing is performed to prepare for an optimization using the collected data. In some embodiments, a step four 208 of the method includes grouping the resource credits based on credit attribute metadata. In some embodiments step four 208 generates an expected resource demand. In some embodiments, in step four 208 histograms are formed of running time of the infrastructure over an analysis period, normalized by the rules of applicable resource credits. Then, in some embodiments in step four 208, buckets are generated of the histograms based on the rules of applicable resource credits. In these embodiments, for each infrastructure running time histogram bucket, all applicable resource credits are gathered by the rules of attribute metadata that is shared between infrastructure elements and resource credits. Step four 208 is optional. In some embodiments, normalization rules are applied to credits in step three 206.

In step five 210 of the method 200, an optimization is performed to determine the optimal allocation of resource credits across the infrastructure buckets. In other words, in this step, the best resource credit configuration is determined to meet the demand with the best expected value. In one particular embodiment, rules of a knapsack algorithm are applied, using capacity, weights and values. In these embodiments, a capacity is the largest normalized value of the resource credits and weights are the normalized values of the resource credits. The values are the normalized running time of each histogram in bucket. That is, values are equal to running-time times the normalization factor over an analysis period. The output of the knapsack algorithm maximizes the application of resource credits to the infrastructure within the infrastructure bucket. In addition, the results provide the unused/underutilized resource credits as well as the unoptimized infrastructure.

In step six 212 of the method 200, the optimization is applied to the cloud infrastructure. For example, for cloud infrastructure the attribute metadata associated with the resource credits is modified to generate modified attribute metadata to represent the best configuration of resource credits determined by the optimization step five 210. In some embodiments, the method proceeds back to step one 202 where the stored resource credit data and processing rules for determining an optimal configuration of resource credits are provided, and the resource credits are thereby continually optimized by executing the steps of the method 200.

Figure 3:
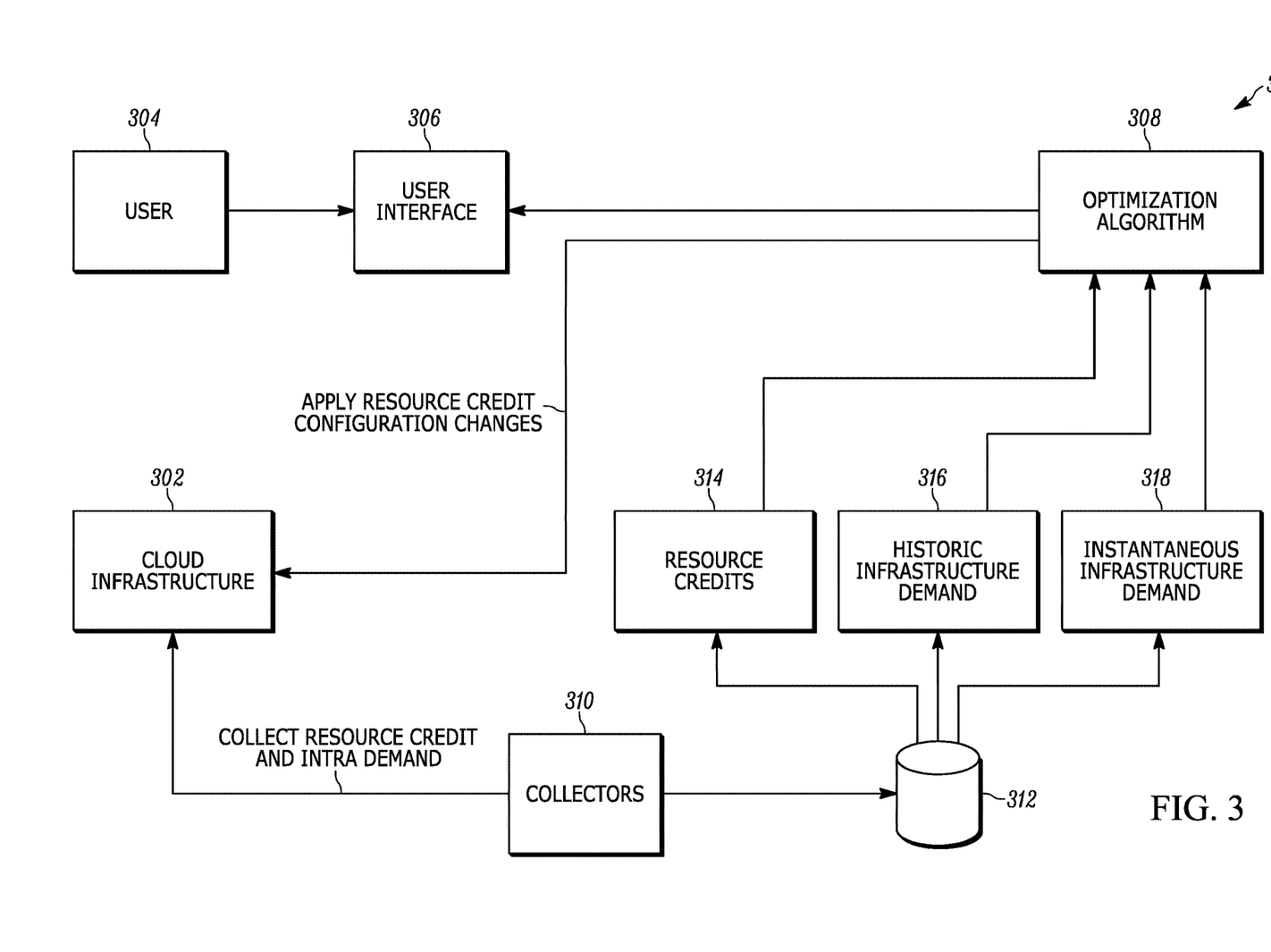
FIG. 3 illustrates a diagram of an end-to-end system and method for adjusting resource credits for a cloud infrastructure according to the present teaching.

FIG. 3 illustrates a diagram of an end-to-end system and method 300 for adjusting resource credits for a cloud infrastructure 302 according to the present teaching. Users 304 interact with a user interface 306. For example, the users 304 can be a business that uses cloud resources for various information technology tasks. The users 304 can also be a financial group in a business that manages contracts for cloud services. In some embodiments, the users 304 can have no control over the cloud infrastructure demands that are generated by their business, but can control the resource credit configurations. In various embodiments, a variety of different users 304 are possible, which can include automated systems that run with little or no human intervention. The user interface 306 provides a mechanism for receiving inputs from the users to control and manage the process of adjusting the resource credits. The user interface 306 also provides outputs to the user including both the outcomes and status of collection and optimization operations that are provide by the optimization algorithm 308.

Collectors 310 collect resource credit data and infrastructure demand information from the cloud infrastructure. For example, the collectors 310 can collect an inventory of resource credits for all or part of the cloud infrastructure 302. The collectors 310 can collect attribute metadata about some or all of the resource credits in the inventory. The attribute metadata can contain, for example, the attributes of a resource credit that allows it to be applied to cloud infrastructure in the cloud infrastructure 302. The collectors 310 can collect server attributes that allow for a resource credit to apply depending on the flexibility of the credit. For example, AWS Elastic Compute Cloud (EC2) instances have a size, tenancy, region, and a billing account which all contribute to the metadata that makes up that instance. EC2 has reserved instances. EC2 instance attributes must match the reservation attributes in order for the discount to apply to the hourly pricing of the instance.

AWS DynamoDB also has similar constructs to EC2 instances, and DynamoDB has reserved capacity. As a further example, Microsoft Azure has virtual machines and these machines have reservations. Google Cloud has compute engines and a committed usage option for these compute engines. Collectors 302 can collect activity data from the cloud infrastructure 302 to determine a current or historic demand. For example, collector 310 can collect the running time of each server running in the cloud infrastructure 302. In various embodiments, there can be one or more collectors 310.

The collectors 310 provide the information to a system 312 that includes a processor and/or memory. In various embodiments, the system 312 produces a version of resource credits 314 based on the collected resource data. These resource credits 314 are processed to be amenable to the optimization algorithm 308 of the particular embodiment. For example, these resource credits 314 can be the attribute metadata representing a particular class of resource credits.

Also, these resource credits 314 can be normalized resource credits, or otherwise processed resource credit data that is provided by the collectors 310. The system 312 may perform the normalization of the resource credits. The system 312 can also produce an expected demand for elements in the cloud infrastructure 302 that is based on historic infrastructure demand 316. In addition, or alternatively, the system 312 can produce an expected demand for elements in the cloud infrastructure 302 that is an instantaneous demand 318, which is, based on the current demand of the elements in the cloud infrastructure 302.

The processed resource credits 314, historic infrastructure demand 316 and/or instantaneous infrastructure demand 318 are provided to the optimization algorithm 308. The optimization algorithm 308 provides a process for computing constraint optimization by maximizing the value of the resource credits. In general, the optimization algorithm 308 finds an improved benefit for the resource credits by determining the best configuration for the credits based on expected demand. In some embodiments, the improved benefit is an optimal benefit as determined by the optimization algorithm. In some embodiments, the improved benefit is a benefit that is better than that achieved by an arbitrary configuration of the credits. In other embodiments, the improved benefit is a benefit that is better than that achieved by application of a greedy algorithm that configures credits to cover the largest resource independent of usage. The optimizations can include, for example, the optimization processes described in more detail in connection with FIG. 1 relating to the optimization engine 102 and/or the processes described in connection with FIG. 2 relating to step five 210 where optimization is performed to determine the optimal allocation of resource credits across the infrastructure buckets.

Figure 4:
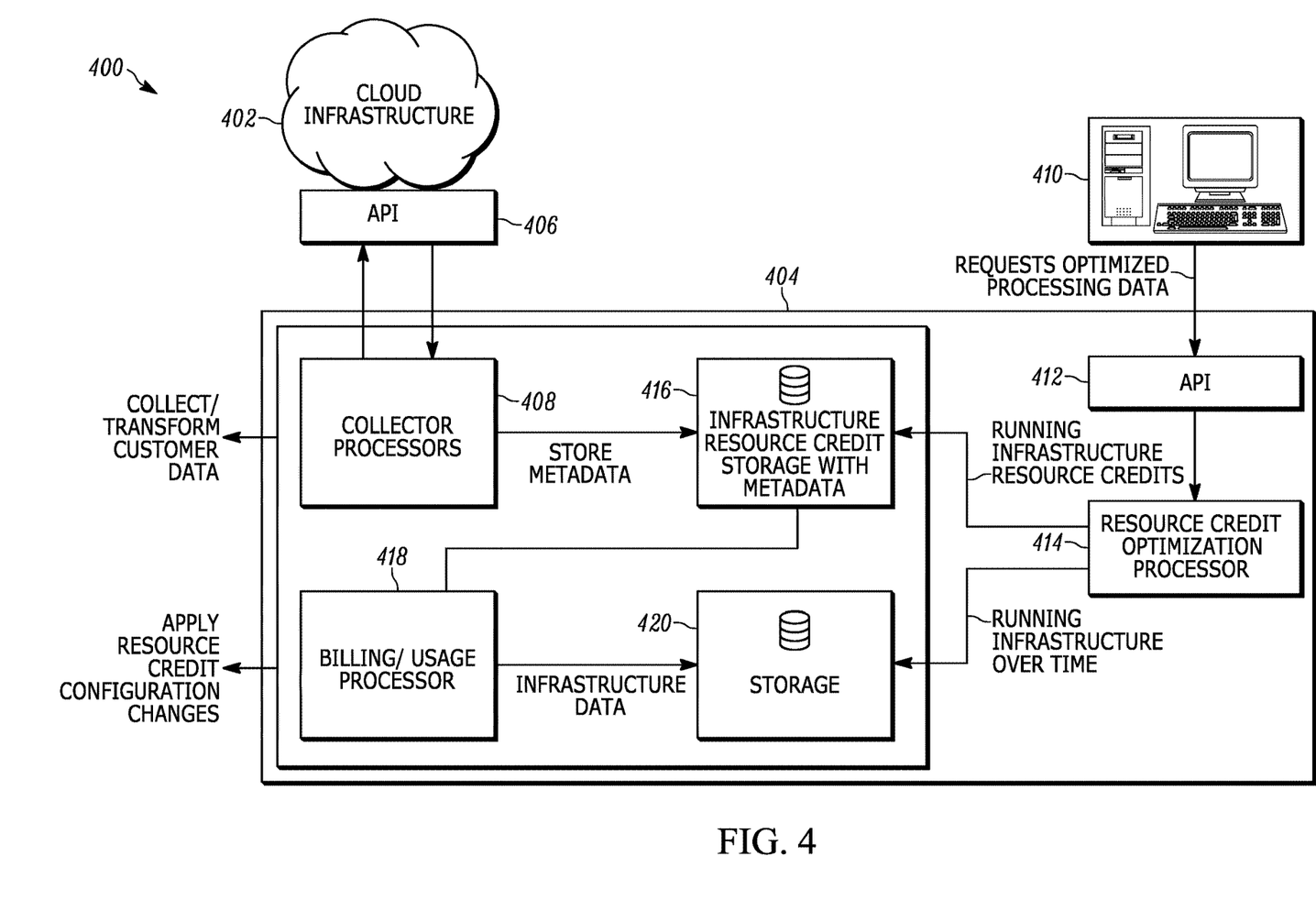
FIG. 4 illustrates a diagram of an end-to-end system and method for adjusting resource credits for a cloud infrastructure according to the present teaching.

FIG. 4 illustrates a diagram of an end-to-end system and method 400 for adjusting resource credits for a cloud infrastructure 402 according to the present teaching. The cloud infrastructure 402 can include a public cloud, private cloud or various combinations thereof. The cloud infrastructure 402 interfaces with the processor system 404 that executes the system and method for adjusting resource credits via an API 406. The API 406 connects to collectors/processors 408 in the processor system 404. In some embodiments API 406 is not used. Collectors 408 collect data about usage and credits from the cloud infrastructure 402, and processors 408 provide processed data back to the cloud infrastructure 402.

Users 410, which can include human users or machines, interface with the processor system 404 via an API 412. The users 410 request optimization from the processor system 404, and also can provide other management and control information to the processor system 404. The API 412 interfaces to the resource credit optimization processor 414.

The embodiment of the end-to-end system and method 400 shown in FIG. 4 leverages storage repositories that are common in cloud-based information technology systems for storing both infrastructure data and records and billing data and records. Data collected by the collector/processor 408 is stored in a repository 416 that includes infrastructure and resource credit data and metadata. The repository 416 provides data that is used by the resource credit optimization processor 414. The repository 416 receives outputs from the resource credit optimization processor 414 that provides the optimal and/or improved resource credit configurations that can be applied to save cost on the cloud infrastructure 402. In some embodiments the improved resource credit configurations are applied to redeem a benefit that is not monetary, for example a quality of service or an availability or other resource benefit.

A billing and usage processor 418 is in communication with the repository 416 as well as a repository 420 that holds infrastructure data. For example, in one specific embodiment, repository 420 is an online analytical processing (OLAP) data base. Repository 420 is also in communication with the resource credit optimization processor 414 and shares information about running of the infrastructure over time. The processor system 404 that implements the method for adjusting resource credits collects and transforms customer data to/from the cloud infrastructure 402 and to/from the users 410. The processor system 404 applies resource credit configuration changes to the cloud infrastructure 402 and to the users 410. Note that the repositories 416, 420 are exemplary and other storage schemes can be used.

Thus, the processor system 404 includes multiple processes that can run in a distributed configuration. A process for collection/processing of running infrastructure resource credit with metadata is performed in the collector/processors 408. Also, a process of collecting/processing running infrastructure as a time series is performed in the collector/processors 408. A process for computing constraint optimization by maximizing resource credits is performed by the resource credit optimization processor 414. Also, a process for retrieving resource credits/running infrastructure with metadata is performed in the optimization algorithm nodes 414 and stored in repository 416. There are also optional processes and elements, such as a method of storing infrastructure data over time in repository 420, a method of storing infrastructure and resource credit metadata in repository 416, and a method of retrieving customer infrastructure and resource credit data via API 406 or other means. It should be understood that the location of the processes described herein is exemplary and that there are many possible configurations of the methods and apparatus for maximizing resource credits across cloud infrastructures according to the present teaching.

Referring to both FIGS. 3 and 4, these figures illustrate how embodiments of the method and system of the present teaching can use the outcome of the optimization process described herein. The users 304, 410, which could be, for example, a finance, program, or technical operations manager, or an automated system, interacts with the processor system 404 or the optimization algorithm 308 through an API 412 or other interface 306 to receive the optimal recommendations on maximizing resource credits across cloud infrastructure 302, 402. In addition, after maximization by the resource credit optimization processor 414 or optimization algorithm 308, the users 304, 410 can then query for unused/underutilized resource credits as well as infrastructure not covered by resource credits. The end-to-end system and method for adjusting resource credits for the cloud infrastructure described in connection with FIG. 3 and the end-to-end system and method for adjusting resource credits for a cloud infrastructure described in connection with FIG. 4 represent examples of end-to-end systems that utilize the system and method of adjusting resource credits according to the present teaching. One skilled in the art will appreciate that numerous other end-to-end systems for maximizing resource credits across cloud infrastructure according to the present teaching can be practiced.

In some embodiments of the present teaching, the recommended credit resource configurations, as well as the changes to the existing configuration required to arrive at that state, are presented to users for consideration. The users can then decide which of those modification to the resource credit configuration to apply. An alternative, which can be selected by the users, is to enable the system to automatically apply those changes, continuously or with a defined frequency. The users can also choose to apply both the optimization algorithm and the new set of recommendations to the cloud provider environment or cloud infrastructure. This automatic configuration ensures that the most cost benefit, and/or other benefit, is accrued on a continuous basis.

Figure 5A:
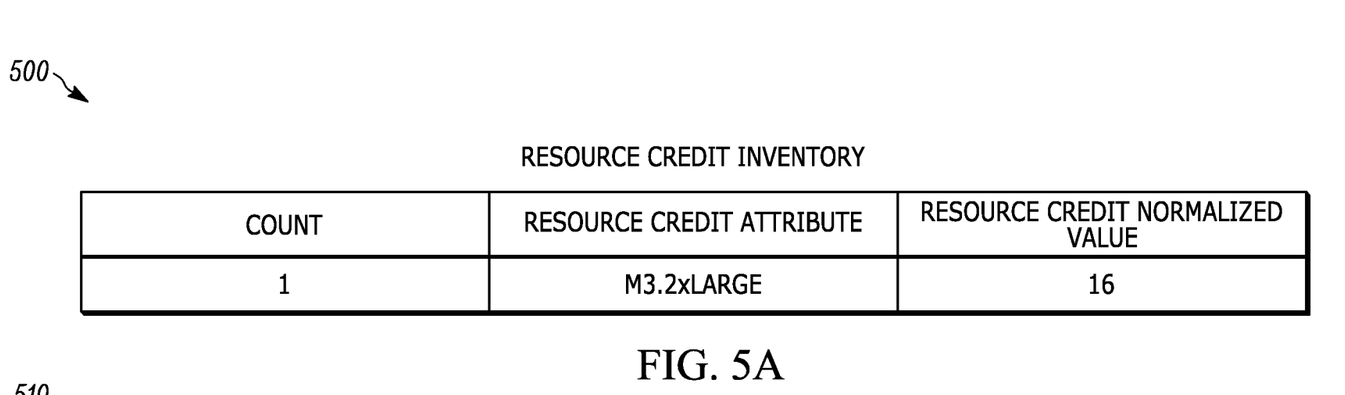
FIG. 5A illustrates a table of an example resource credit inventory according to the present teaching.
Figure 5B:
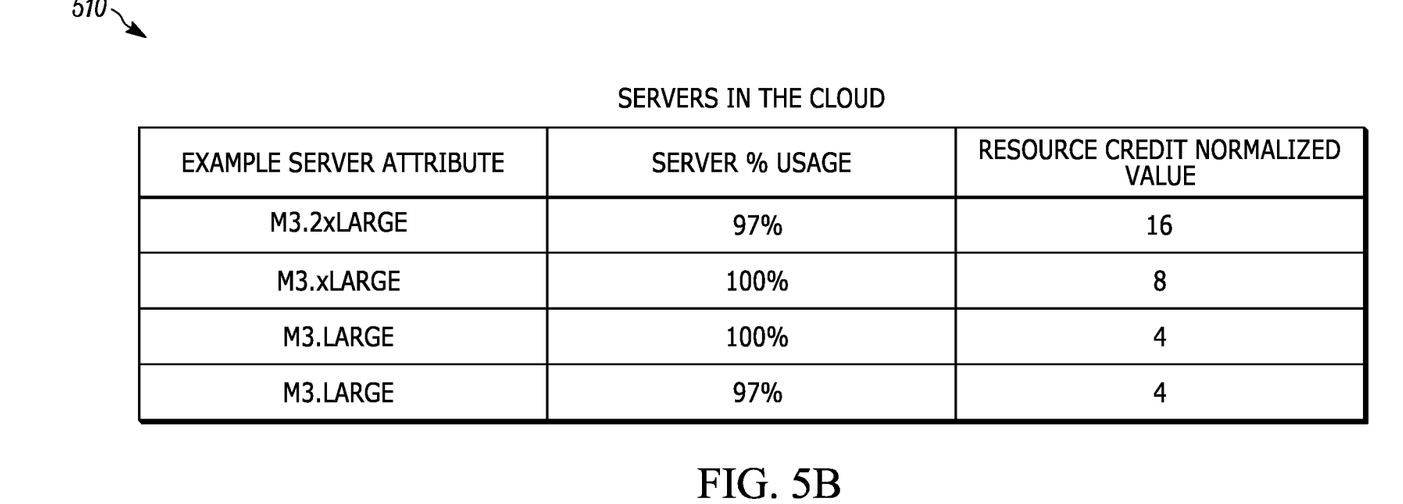
FIG. 5B illustrates a table of resource credits from the inventory described in connection with FIG. 5A applied to infrastructure buckets that include servers in a cloud using a configuration determined by a known credit allocation system.
Figure 5C:
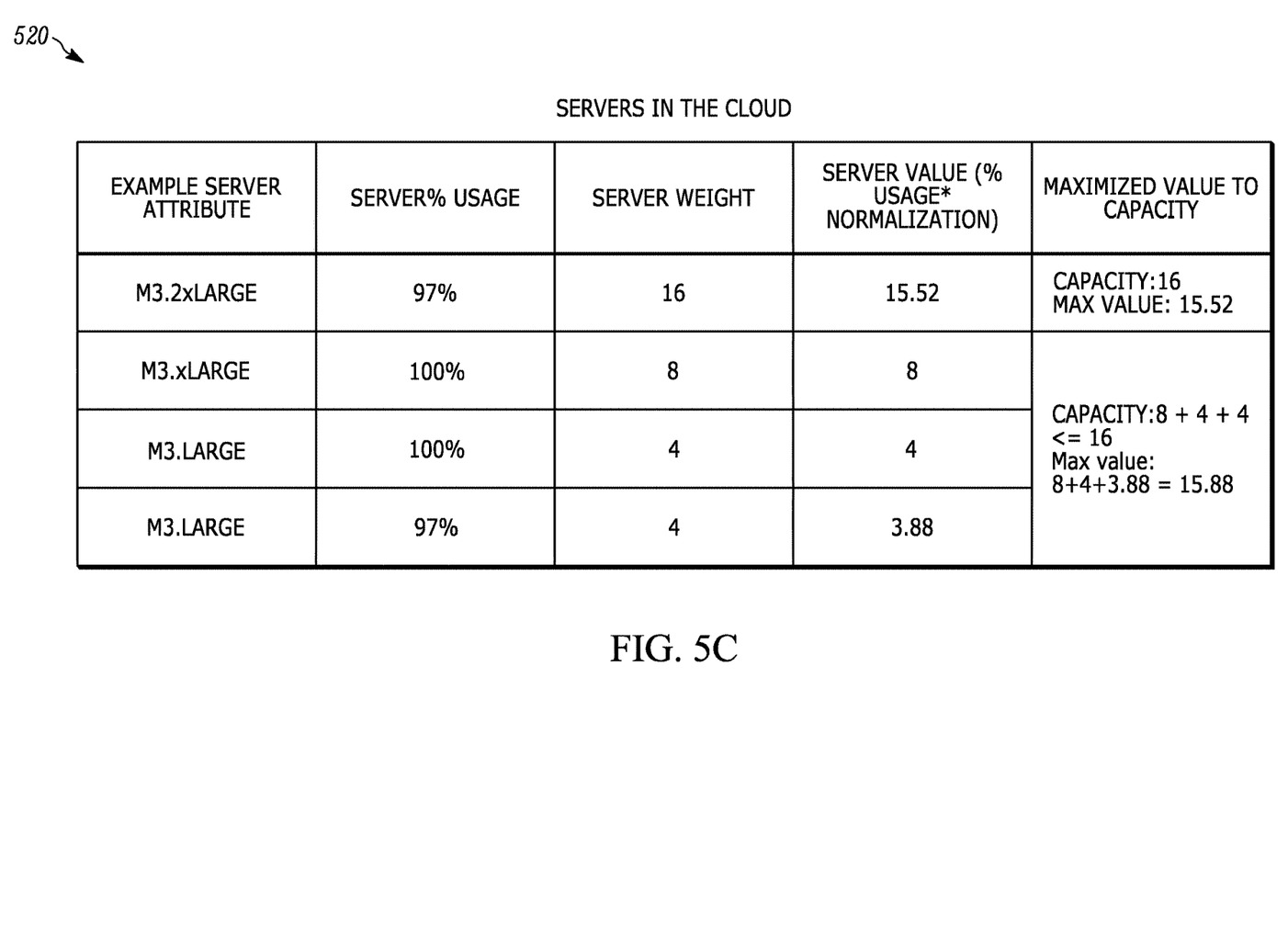
FIG. 5C illustrates a table of resource credits from the inventory described in connection with FIG. 5A applied to infrastructure buckets that include servers in the cloud described in connection with FIG. 5B using a configuration determined by an embodiment of a method according to the present teaching.

The data from tables in FIGS. 5A-C illustrate the benefit of one embodiment of the system and method for maximizing resource credits across cloud infrastructure according to the present teaching as compared to a known system and method for applying credits. FIG. 5A illustrates a table 500 of an example resource credit inventory according to the present teaching. The resource credit inventory includes an attribute m3.2xlarge, and has a resource credit normalized value of sixteen. FIG. 5B illustrates a table 510 of resource credits from the inventory described in connection with FIG. 5A applied to infrastructure buckets that include servers in a cloud using a configuration determined by a known credit allocation system. This is suboptimal because the data of table 510 would take the resource credit and apply it using a typical greedy algorithm to determine that the credit should go to the m3.2xlarge server because the normalized value is sixteen. Instead, the m3.2xlarge resource credit should be applied to the one m3.xlarge and two m3.large servers because of the higher usage of the combination of the smaller servers.

FIG. 5C illustrates a table 520 of resource credits from the inventory described in connection with FIG. 5A applied to infrastructure buckets that include servers in the cloud described in connection with FIG. 5B using a configuration determined by an embodiment of a method according to the present teaching. A server value score is determined, and a maximized value to capacity is calculated using the server infrastructure buckets. As can be seen by comparing data in the column labeled "maximized value to capacity", the maximum value of 15.88 is determined for the infrastructure bucket that includes the one m3.xlarge and two m3.large servers. This is compared to a maximum value of 15.52 determined for the infrastructure bucket that includes the m3.2xlarge server. Thus, the resource credit configuration that is selected by the method of the present teaching is applying the credit to the one m3.xlarge and two m3.large servers. Thus, the method provides an improved resource credit benefit by using this configuration. As such, this configuration is applied to the infrastructure. In some methods this configuration is applied by modifying the attribute metadata associated with the credit.

Some embodiments of the present teaching allow users to set a time window to analyze usage, set a purchase date, and choose a prepay amount based on a recommendation from the optimizer. In various embodiments, the recommendations weigh variables, such as historical usage, reservation types, tiered discounts, enterprise pricing, expiring reservations, and other parameters associated with resource credits. In some embodiments it is possible to visualize the infrastructure based on the purchase recommendation. In some embodiments a purchase order can be generated by a process that follows the optimization.

In some embodiments, when a user moves an instance to a new availability zone, shuts down running instances, and/or changes a workload to a different instance type, the system actively monitors usage and makes recommended moves to ensure the resource credits are always fully optimized. In these embodiments, the system can analyze and evaluate resource reservations including, for example, no-upfront, partial-upfront, all-upfront, modifications, and/or related contractual terms.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A computer-implemented method of adjusting a resource credit configuration for cloud resources, the method comprising:

collecting, by executing an instruction with a processor, a resource credit inventory for a prepaid resource credit purchase and attribute metadata related to resources from one or more cloud resources;

determining, by executing an instruction with the processor, an expected resource demand;

generating a common class of resource credit based on the attribute metadata and determining an expected resource demand for the common class;

determining, by executing an instruction with the processor, a plurality of resource credit configurations that match the determined expected resource demand;

determining, by executing an instruction with the processor, a first score for a first one of the plurality of resource credit configurations, the first score determined based on 1) a first expected resource demand of a first server in the first one of the plurality of resource credit configurations and a first resource credit value associated with the first server, and 2) a second expected resource demand of a second server in the first one of the plurality of resource credit configurations and a second resource credit value associated with the second server;

determining, by executing an instruction with the processor, a second score for a second one of the plurality of resource credit configurations, the second score determined based on 1) a third expected resource demand of a third server in the second one of the plurality of resource credit configurations and a third resource credit value associated with the third server, and 2) a fourth expected resource demand of a fourth server in the second one of the plurality of resource credit configurations and a fourth resource credit value associated with the fourth server;

determining, by executing an instruction with the processor, an improved resource credit benefit based on the first score and the second score; and reconfiguring, by executing an instruction with the processor, the cloud resources to apply the improved resource credit benefit.

2. The computer-implemented method of adjusting the resource credit configuration for cloud resources of claim 1, wherein the expected resource demand is determined by analyzing a historical resource demand based on resource attributes and demand level.

3. The computer-implemented method of adjusting the resource credit configuration for cloud resources of claim 1, wherein the expected resource demand is determined by analyzing a current resource demand.

4. The computer-implemented method of adjusting the resource credit configuration for cloud resources of claim 3, further including:
applying the determined modified attribute metadata to the cloud resources for a duration of time.

5. The computer-implemented method of adjusting the resource credit configuration for cloud resources of claim 1, wherein the determining the improved resource credit benefit based on the resource credit inventory and on the plurality of credit configurations that match the determined expected resource demand comprises:
determining a weight capacity based on available credits;
determining a plurality of values of an accrued resource credit benefit based on the plurality of credit configurations that match the expected resource demand;
applying available credits to a resource and determining a new weight capacity; and
determining a condition wherein at least one of the determined plurality of values of the accrued benefit is greater than or equal to all the other ones of the determined plurality of values of the accrued benefit and the new weight capacity is less than the weight capacity.

6. A computer system for determining a resource credit configuration for a cloud infrastructure, the computer system comprising:
a cloud infrastructure comprising one or more elements;
a collector electrically connected to the cloud infrastructure, the collector being configured to collect a resource credit inventory for a prepaid resource credit purchase and attribute metadata from the one or more elements in the cloud infrastructure;
a memory device that stores rules to determine an improved resource credit benefit based on the resource credit inventory; and
a processor having an input electrically connected to an output of the collector and having an input electrically connected to an output of the memory device, the processor receiving the collected resource credit inventory and attribute metadata from the collector and being configured to determine modified attribute metadata by:
determining an expected resource demand;
generating a common class of resource credit based on the attribute metadata and determining an expected resource demand for the common class;
determining a plurality of resource credit configurations that match the determined expected resource demand;
determining a first score for a first one of the plurality of resource credit configurations, the first score determined based on 1) a first expected resource demand of a first server in the first one of the plurality of resource credit configurations and a first resource credit value associated with the first server, and 2) a second expected resource demand of a second server in the first one of the plurality of resource credit configurations and a second resource credit value associated with the second server;
determining a second score for a second one of the plurality of resource credit configurations, the second score determined based on 1) a third expected resource demand of a third server in the second one of the plurality of resource credit configurations and a third resource credit value associated with the third server, and 2) a fourth expected resource demand of a fourth server in the second one of the plurality of resource credit configurations and a fourth resource credit value associated with the fourth server;
determining the improved resource credit benefit based on the score and the second score; and
reconfiguring, by executing an instruction with the processor, the cloud infrastructure to apply the improved resource credit benefit.

7. The computer system for determining the resource credit configuration for the cloud infrastructure of claim 6, wherein the processor is further configured to:
determine a weight capacity based on available credits;
determine a plurality of values of an accrued resource credit benefit based on the plurality of credit configurations that match the expected resource demand;
apply available credits to a resource and determining a new weight capacity; and
determine a condition wherein at least one of the determined plurality of values of the accrued benefit is greater than or equal to all the other ones of the determined plurality of values of the accrued benefit and the new weight capacity is less than the weight capacity.

8. The computer system for determining the resource credit configuration for the cloud infrastructure of claim 6, wherein the processor is further configured to:
determine the expected resource demand by analyzing a current resource demand;
apply the determined modified attribute metadata to the cloud infrastructure for a duration of time; and
repeat determining modified attribute metadata based on the determined improved resource credit benefit.

9. The computer system for determining the resource credit configuration for the cloud infrastructure of claim 6, wherein the processor is further configured to generate a histogram based on a history of usage data.

10. The computer system for determining the resource credit configuration for the cloud infrastructure of claim 6, wherein the processor is further configured to determine an underutilized resource credit for the cloud infrastructure based on the improved resource credit benefit.

11. The computer system for determining the resource credit configuration for the cloud infrastructure of claim 6, wherein at least one of the one or more elements comprises a CPU.

12. The computer system for determining the resource credit configuration for the cloud infrastructure of claim 6, wherein at least one of the one or more elements comprises a virtual machine.

13. The computer system for determining the resource credit configuration for the cloud infrastructure of claim 6, wherein at least one of the one or more elements comprises a storage resource.

14. The computer system for determining the resource credit configuration for the cloud infrastructure of claim 6, wherein at least one of the one or more elements comprises a disk.

* * * * *